United States Patent
Lefcourt et al.

(10) Patent No.: US 11,746,728 B1
(45) Date of Patent: Sep. 5, 2023

(54) PROPULSION SYSTEM WITH GROOVED INERT RODS FOR REACTIVE WIRE

(71) Applicant: Raytheon Company, Waltham, MA (US)

(72) Inventors: Adam I. Lefcourt, Tucson, AZ (US); Bradley J. Goodman, Tucson, AZ (US); Todd R. Kornfeld, Tucson, AZ (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 17/709,700

(22) Filed: Mar. 31, 2022

(51) Int. Cl.
*F02K 9/26* (2006.01)
*F02K 9/24* (2006.01)
*F02K 9/95* (2006.01)

(52) U.S. Cl.
CPC ............ *F02K 9/26* (2013.01); *F02K 9/24* (2013.01); *F02K 9/95* (2013.01)

(58) Field of Classification Search
CPC .......... F02K 9/08–40; F02K 9/70; F02K 9/72; F02K 9/763; F02K 9/94
USPC ......................................................... 102/289
See application file for complete search history.

(56) References Cited

U.S. PATENT DOCUMENTS

| | | | | |
|---|---|---|---|---|
| 2,548,926 A | * | 4/1951 | Africano | F02K 9/36 60/255 |
| 2,703,960 A | * | 3/1955 | Spencers | F02K 9/26 60/39.47 |
| 2,792,758 A | * | 5/1957 | Bach | F02K 9/20 89/1.807 |
| 2,957,309 A | * | 10/1960 | Kobbeman | F02K 9/36 60/39.47 |
| 3,069,844 A | * | 12/1962 | Bearer | F02K 9/95 60/39.47 |
| 3,109,375 A | * | 11/1963 | Rumbel | F02K 9/10 149/3 |
| 3,128,706 A | * | 4/1964 | Rumbel | F02K 9/70 60/39.47 |
| 3,359,350 A | * | 12/1967 | Godfrey | F02K 9/26 264/108 |

(Continued)

OTHER PUBLICATIONS

NASA, Solid Rocket Motor Metal Cases, Apr. 1970, N70-29740, NASA SP-8025, p. 19 (Year: 1970).*

(Continued)

*Primary Examiner* — Todd E Manahan
*Assistant Examiner* — Marc J Amar
(74) *Attorney, Agent, or Firm* — Renner, Otto, Boisselle & Sklar

(57) ABSTRACT

A rocket motor includes at least one inert rod. The inert rod has a groove that extends along the length of the inert rod. The groove may be machined by a lathe, die, and/or CNC machine, such that the groove is configured helically around the rod. A reactive wire is inserted into the groove along the length of the inert rod. The grooved inert rod, and the reactive wire together constitute the burn rate enhancer assembly. The rocket motor is configured such that the burn rate enhancer assembly is inserted into a rocket motor casing. The rocket motor casing is then filled with a burnable propellant grain, the highly loaded grain, which is in a liquid or semi-solid state. The highly loaded grain then cures in the rocket motor casing around the burn rate enhancer assembly.

19 Claims, 5 Drawing Sheets

(56) References Cited

U.S. PATENT DOCUMENTS

| | | | | |
|---|---|---|---|---|
| 3,509,822 | A * | 5/1970 | Burton | C06B 45/00 |
| | | | | 102/289 |
| 3,635,030 | A * | 1/1972 | Schubert | C06B 45/12 |
| | | | | 60/39.47 |
| 3,717,998 | A * | 2/1973 | Betts | F02K 9/30 |
| | | | | 60/263 |
| 3,786,633 | A * | 1/1974 | Worcester | F02K 9/36 |
| | | | | 60/255 |
| 3,898,934 | A * | 8/1975 | Mercier | F02K 9/14 |
| | | | | 102/285 |
| 4,103,584 | A * | 8/1978 | Lista | C06B 21/0033 |
| | | | | 264/3.1 |
| 7,409,911 | B2 * | 8/2008 | Tiernan | F42D 1/04 |
| | | | | 166/308.1 |
| 9,227,883 | B2 | 1/2016 | Sippel et al. | |
| 10,766,830 | B2 | 9/2020 | Jain et al. | |
| 11,008,263 | B2 * | 5/2021 | Isert | C06B 43/00 |
| 2002/0062756 | A1 * | 5/2002 | Archer, Jr. | F02K 9/24 |
| | | | | 102/292 |

OTHER PUBLICATIONS

Sangtyani, et al., "An alternative approach to improve burning rate characteristics and processing parameters of composite propellant," Combustion and Flame 209, 2019, pp. 357-362.

Collard, et al., "Tailoring the reactivity of printable Al/PVDF filament," Elsevier, 2020, pp. 1-28.

Monique S. McClain, "Additive Manufacturing of Viscous Materials: Development and Characterization of 3D Printed Energetic Structures," School of Aeronautics and Astronautics, Dissertation, Aug. 2020, pp. 1-157.

Isert, et al., "Tailoring Burning Rates Using Reactive Wires in Composite Solid Rocket Propellants," Elsevier, 2016, pp. 1-17.

* cited by examiner

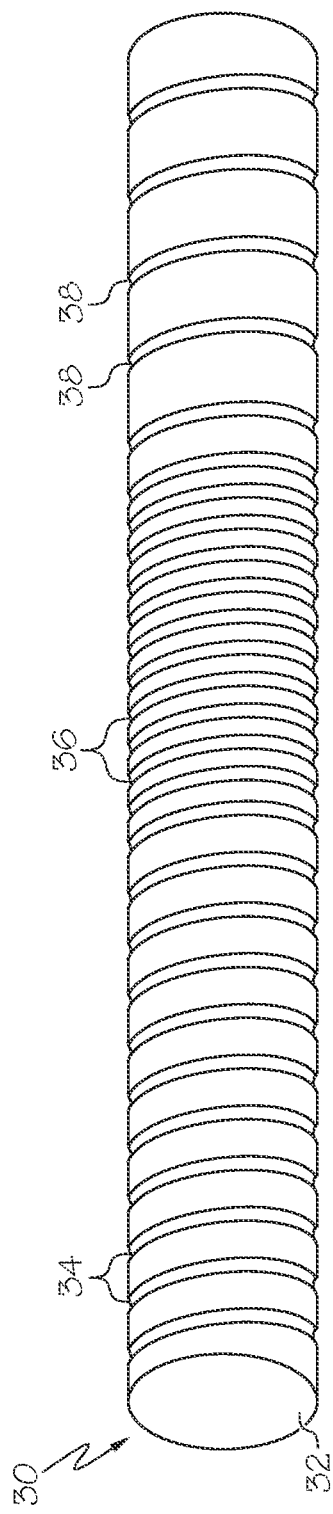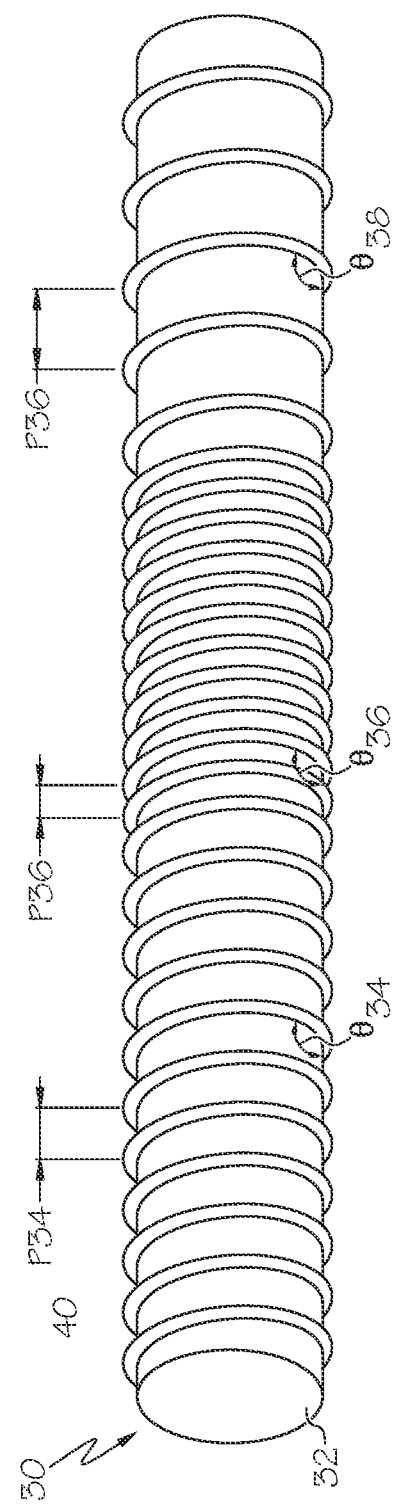

PROPULSION SYSTEM WITH GROOVED INERT RODS FOR REACTIVE WIRE

FIELD

The present disclosure is in the field of devices and methods for propulsion using rocket motors.

BACKGROUND

Rocket motors are a known way to provide thrust. Highly Loaded Grain/Burn Rate Enhancer (HLG/BRE) motors utilize wires to control propellant regression rates to achieve a desired thrust profile.

SUMMARY

HLG/BRE motors are susceptible to unpredictable performance variations due to inconsistencies in the orientation of the BRE-wires. The present disclosure solves these inconsistencies.

According to an aspect of the disclosure, a rocket motor comprises: a motor case containing a burnable propellant grain; and a burn rate enhancer assembly; wherein the burn rate enhancer assembly includes: a groove wherein the groove extends along a portion of the length of the inert rod; and a reactive wire wherein the reactive wire is received in the groove.

According to an embodiment of any paragraph(s) of this summary, the burn rate enhancer assembly is disposed within the burnable propellant grain.

According to an embodiment of any paragraph(s) of this summary, the burn rate enhancer assembly is configured helically along the portion of the length of the inert rod.

According to an embodiment of any paragraph(s) of this summary, the helical configuration of the burn rate enhancer assembly has a consistent pitch along the length the inert rod.

According to an embodiment of any paragraph(s) of this summary, the helical configuration of the burn rate enhancer assembly has a varying pitch along the length of the inert rod.

According to an embodiment of any paragraph(s) of this summary, increasing the pitch increases the regression rate of the burnable propellant grain.

According to an embodiment of any paragraph(s) of this summary, decreasing the pitch decreases the regression rate of the burnable propellant grain.

According to an embodiment of any paragraph(s) of this summary, the reactive wire is formed of an energetic metal or energetic alloy material.

According to an embodiment of any paragraph(s) of this summary, the reactive wire is coated with a tackifier coating.

According to an embodiment of any paragraph(s) of this summary, a portion of the reactive wire protrudes out of the groove.

According to an embodiment of any paragraph(s) of this summary, the groove has a constant depth along the length of the inert rod.

According to an embodiment of any paragraph(s) of this summary, the motor case is made of metal or reinforced composite.

According to an embodiment of any paragraph(s) of this summary, the motor case is an annular motor case.

According to an embodiment of any paragraph(s) of this summary, the inert rod is comprised of a non-energetic material.

According to an embodiment of any paragraph(s) of this summary, the inert rod is a non-energetic material such as nylon.

According to an aspect of the disclosure, a rocket motor comprises: a motor case containing a burnable propellant grain; and a burn rate enhancer assembly; wherein the burn rate enhancer assembly includes: a groove wherein the groove extends along a portion of the length of the inert rod; and a reactive wire wherein the reactive wire is received in the groove; the burn rate enhancer assembly is configured helically along the portion of the length of the inert rod; and the burn rate enhancer assembly is disposed within the burnable propellant grain.

According to an embodiment of any paragraph(s) of this summary, the helical configuration of the burn rate enhancer assembly has a consistent pitch along the length the inert rod.

According to an embodiment of any paragraph(s) of this summary, the helical configuration of the burn rate enhancer assembly has a varying pitch along the length of the inert rod.

According to yet another aspect of the disclosure, a method of making a rocket motor includes the steps of: selecting an inert rod; machining the inert rod to have a groove in a helical configuration along a length of the rod; inserting a reactive wire inside the groove; positioning the inert rod and reactive wire assembly in a motor casing; and filling the motor casing with a burnable propellant grain such that it cures around the inert rod and reactive wire assembly.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

FIGS. 4A and 4B are oblique views of an inert rod of a rocket motor according to an embodiment of the disclosure.

DETAILED DESCRIPTION

A rocket motor includes at least one inert rod. The inert rod has a groove that extends along the length of the inert rod. The groove may be machined by a lathe, die, and/or CNC machine, such that the groove is configured helically around the rod. A reactive wire is inserted into the groove along the length of the inert rod. The grooved inert rod, and the reactive wire together constitute the burn rate enhancer assembly. The rocket motor is configured such that the burn rate enhancer assembly is inserted into a rocket motor casing. The rocket motor casing is then filled with a burnable propellant grain, the highly loaded grain, which is in a liquid or semi-solid state. The highly loaded grain then cures in the rocket motor casing around the burn rate enhancer assembly. The burn rate enhancer assembly controls the regression rate of the propellant grain. The regression rate can be increased or decreased depending on how the reactive wire is wrapped around the inert rod.

Figure 1:
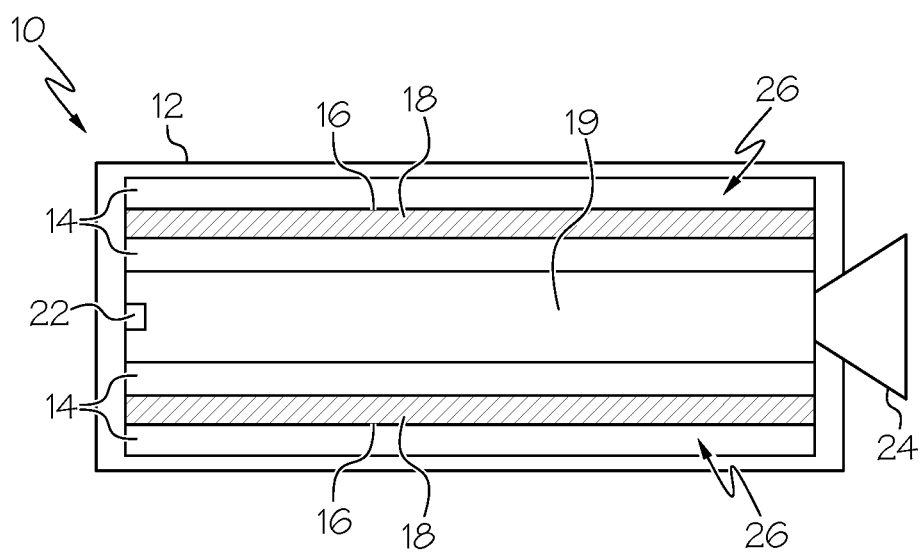
FIG. 1 is a schematic view of a rocket motor in accordance with an embodiment of the disclosure.

FIG. 1 shows a rocket motor 10 that includes a motor casing 12. The motor casing 12 may be made of a suitable metal, such as steel, aluminum, titanium, or other suitable metals (or non-metals). In the illustrated embodiment the motor casing 12 has a cylindrical shape. In further embodiments it is foreseeable that the motor casing 12 may be of another suitable shape. The motor casing 12 may be filled with a burnable propellant grain 14. The rocket motor 10 is an end burning design (HLG), the propellant grain 14 being throughout combustion chamber 19. Disposed within an end of the motor casing is an ignitor 22 and disposed at another end of the motor casing is a nozzle 24.

The present embodiment depicts inert rods 16 shown disposed within the motor casing 12, however it is to be appreciated that it is anticipated that only one inert rod 16 may be included in the rocket motor 10 assembly or more than one inert rod 16 may be included in the rocket motor 10 assembly. The inert rods 16 may be made of a suitable non-metallic material with a low melting point such as nylon, plastic, or other suitable non-energetic materials. The inert rods 16 are wrapped with reactive wires 18. The reactive wires 18 are received within grooves 20 (FIG. 3B) in the inert rods 16. The inert rod 16, groove 20, and reactive wire 18 make up a burn rate enhancer assembly 26. The reactive wire 18 may be made of a suitable energetic metal or energetic alloy material, a non-limiting example of a suitable material being silver. The burn rate enhancer assembly 26 is disposed within the burnable propellant grain 14. In some embodiments, the inert rod may have a diameter of approximately 0.125+/−0.30 inches and the wire rod may have a diameter of approximately 0.030+/−0.005 inches.

During operation of the rocket motor 10 the ignitor 22 ignites the initial exposed propellant grain 14. In some embodiments the ignitor 22 may ignite the reactive wires 18 of the burn rate enhancer assembly 26.

Figure 2:
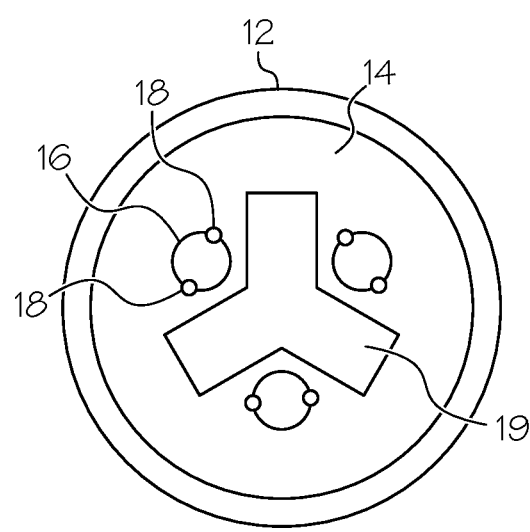
FIG. 2 is a cross-sectional view of a rocket motor in accordance with an embodiment of the disclosure.

FIG. 2 depicts a cross sectional view of a rocket motor 10. A motor case 12 contains burnable propellant grain 14. The burnable propellant grain 14 is located in front of the aft combustion chamber 19. Disposed within the burnable propellant grain are three inert rods 16. The inert rods 16 have a groove 20 that extends helical along the length of the inert rod 16. The inert rods 20 may also be referred to herein as the grooved inert rods. Reactive wires 18 are partially retained within the grooves 20 of the inert rods 16 such that a portion of the reactive wires protrude from the grooves. A majority, minority, or half of the reactive wires 18 may protrude from the grooves. reactive wires 18.

Figure 3A:
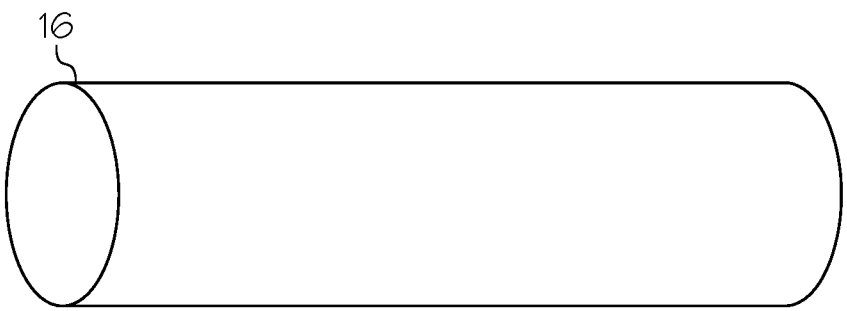
FIGS. 3A, 3B, and 3C are oblique views of an inert rod of a rocket motor according to an embodiment of the disclosure.
Figure 3B:
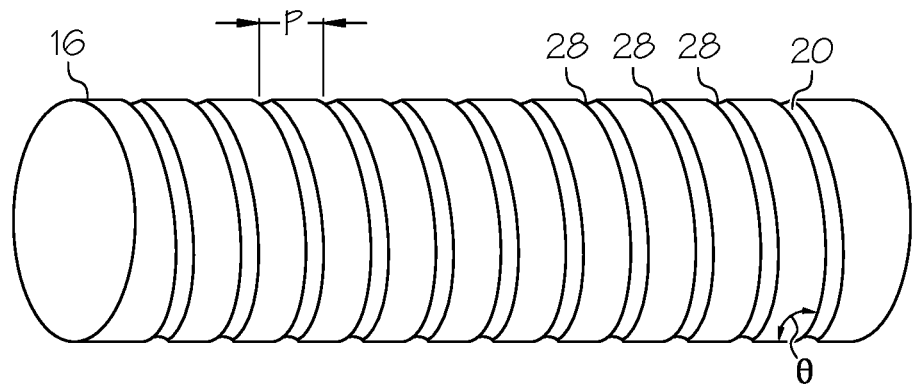
Figure 3C:
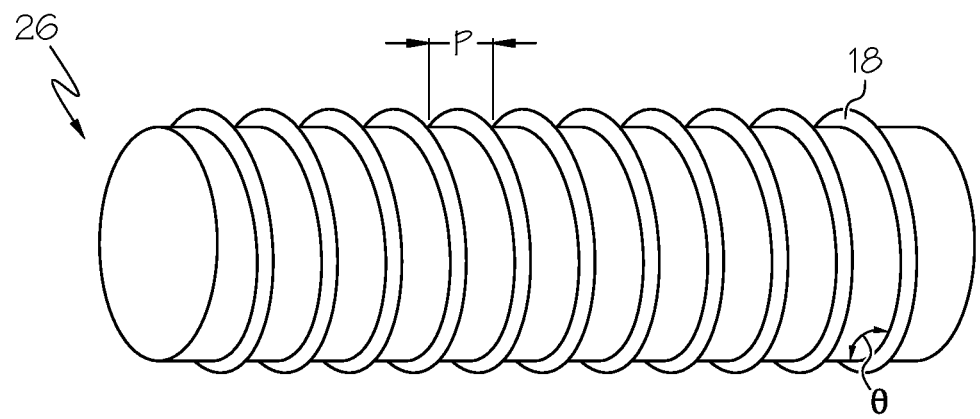

FIGS. 3A-3C shows the different stages of construction of the burn rate enhancer assembly 26. FIG. 3A shows the inert rod 16 it its solid cylindrical ungrooved configuration. FIG. 3B depicts the inert rod 16 with a groove 20 machined along the length of the inert rod 16. In the depicted embodiment, the groove 20 is shown to have a helical configuration along the length of the inert rod 16. FIG. 3B shows the groove having a constant pitch P and constant pitch angle θ. Pitch P is the distance between two groove threads 28, and pitch angle θ is the angle that the groove threads 28 are positioned along the length of the inert rod 16. FIG. 3C depicts a reactive wire 18 disposed within the groove 20. The pitch P and pitch angle θ of the reactive wire 18 is consistent with the pitch P and pitch angle θ of the groove 20. The groove 20 is deep and wide enough to receive the reactive wire 18 such that a portion of the reactive wire 18 protrudes out of the groove 20. In some embodiments a tackifier coating or bond liner may be applied to the inert rod 16, reactive wire 18, and/or groove 20 to further secure the reactive wire 18 in the groove 20. The tackifier coating of bond liner promotes adhesion of the reactive wire 18 to the inert rod 16. Pitch P must be greater than 0.080 inches to prevent the burning energetic wire from jumping ahead to the next wire pitch.

In the depicted embodiment the pitch P and pitch angle θ of the reactive wire 18 are constant along the length of the inert rod 16. The pitch P and pitch angle θ of the reactive wire allows for the propellant regression rate of the rocket motor to be controlled. A higher pitch results in a faster regression rate. Inversely, a lower pitch results in a slower regression rate. The groove 20 allows for accurate implementation of the desired regression rate because the reactive wire 18 does not move from its initial position and alter the pitch during assembly or propellant casting operations.

Regression rate is the rate at which the propellant grain 14 is burned during operation of the rocket motor 10. As disclosed above, the reactive wire 18 is wound around the inert rod 16. When the reactive wire 16 ignites, it begins to be consumed along with the inert rod 16. Due to the helical configuration, a designer of the rocket motor can calculate how long it will take for the reactive wire 18 to be fully consumed. Thereby in instances where it is desirable for the propellant grain to burn at a high (fast) regression rate, then a burn rate enhancer assembly 26 where the pitch P and pitch angle θ are both large would be appropriate. Inversely, if it is desirable for the propellant grain to burn at a low (slow) regression rate, then it would be appropriate to choose a burn rate enhancer assembly 26 where the pitch P and pitch angle θ are both small. This is because the more turns around the inert rod 16 the reactive wire 18 has the more reactive wire 18 must be consumed to travel along the length of the inert rod.

FIGS. 4A and 4B depict a burn rate enhancer assembly 30 where the pitch $P_{34}$, $P_{36}$, and $P_{38}$ and pitch angle $\theta_{34}$, $\theta_{36}$, and $\theta_{38}$ of the reactive wire 40 and groove threads 34, 36, and 38 differ along the length of the inert rod 32. It may be desirable to have differing pitch angles and pitch along the length of the inert rod 32 because during the operation of the rocket motor it may be necessary to control the regression rate of the propellant in a non-uniform manner.

Figure 5:
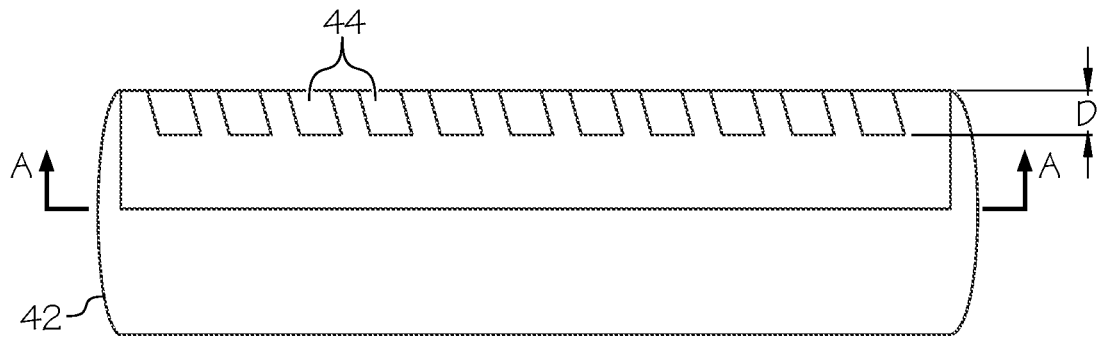
FIG. 5 is an oblique cross-sectional view of an inert rod of a rocket motor according to an embodiment of the disclosure.

FIG. 5 depicts a cross-sectional view of a grooved inert rod 42 with groove threads 44 along cross-section A-A. The groove depth D of the groove threads 44 is constant along the length of the grooved inert rod 42. The constant groove depth D allows for a reactive wire to have a constant positioning, thickness, and/or protrusion along the length of the inert rod 42.

Figure 6:
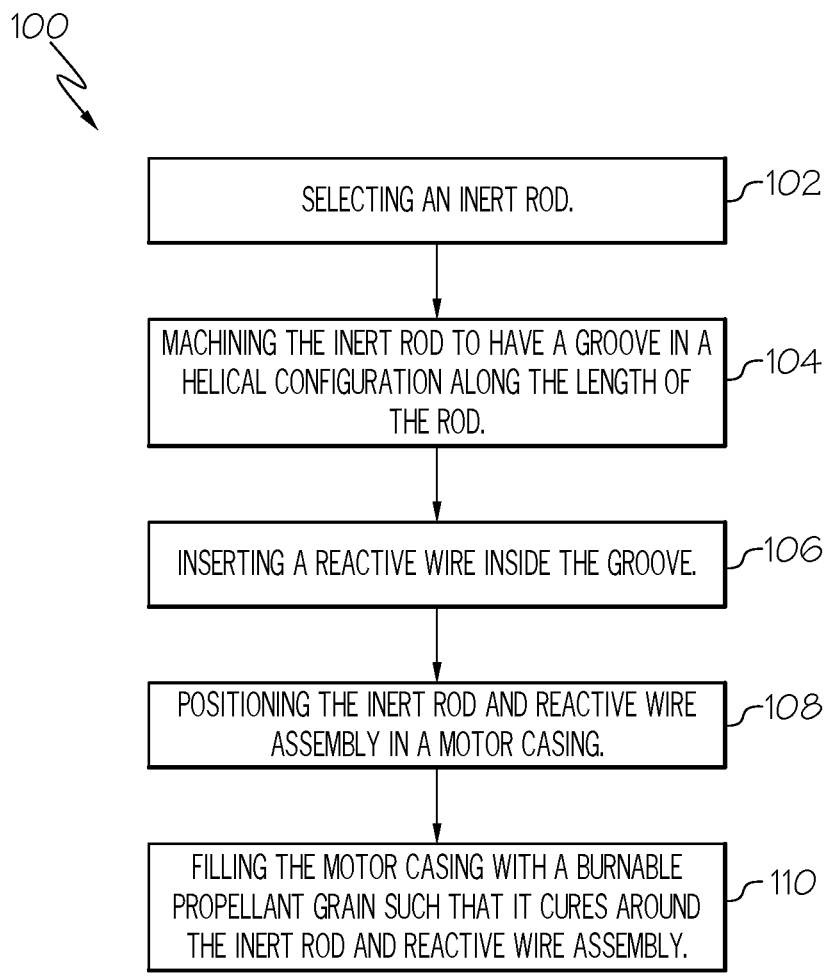
FIG. 6 is a high-level flowchart of a method of making a rocket motor, such as the rocket motor of FIG. 1, according to an embodiment of the disclosure.

FIG. 6 shows high-level steps of a method 100 of making the rocket motor 10 (FIG. 1). In step 102, an inert rod 16 (FIG. 1) of desirable length, thickness, and material is selected for use in the rocket motor 10. In step 104, the inert rod 16 is then machined to have a groove 20 (FIG. 3B) in a helical configuration along the length of the inert rod 16. The rod may be lathed, cut with a die, cut with a computer numerical control (CNC) machine, and/or any other suitable means for machining to form the groove 20. In step 106, once the groove 20 is machined into the inert rod 16, a reactive wire 18 (FIG. 1) of suitable length and thickness is inserted into the groove 20 along the length of the inert rod 16. The reactive wire 18 sits in the groove 20 such that a portion of the wire protrudes out of the groove. In step 108, the inert rod and reactive wire assembly, also referred herein as the burn rate enhancer assembly 26 (FIG. 1), are positioned in a motor casing 12 (FIG. 1). In step 110, the motor casing 12 is then filled with a burnable propellant grain 14 (FIG. 1) which is in a liquid or semi-solid state. The propellant grain 14 then cures in the motor casing 12 and around the burn rate enhance assembly 26.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A rocket motor comprising:
   a motor case containing a burnable propellant grain; and
   a burn rate enhancer assembly disposed within the motor case including:
      an inert rod;
      a groove in an exterior surface of the inert rod and extending along the length of the inert rod; and
      a reactive wire in the groove.

2. The rocket motor of claim 1, wherein the burn rate enhancer assembly is disposed within the burnable propellant grain.

3. The rocket motor of claim 1, wherein the groove and reactive wire are configured helically along the length of the inert rod.

4. The rocket motor of claim 3, wherein the helical configuration of the groove and reactive wire has a constant pitch along the length the inert rod.

5. The rocket motor of claim 3, wherein the helical configuration of the groove and reactive wire has a varying pitch along the length of the inert rod.

6. The rocket motor of claim 3, wherein the helical configuration of the groove and reactive wire has a constant pitch angle along the length the inert rod.

7. The rocket motor of claim 3, wherein the helical configuration of the groove and reactive wire has a varying pitch angle along the length of the inert rod.

8. The rocket motor of claim 1, wherein the reactive wire is formed of an energetic metal or alloy material.

9. The rocket motor of claim 1, wherein the reactive wire is coated with a tackifier coating.

10. The rocket motor of claim 1, wherein a portion of the reactive wire protrudes out of the groove.

11. The rocket motor of claim 1, wherein the groove has a constant depth along the length of the inert rod.

12. The rocket motor of claim 1, wherein the motor case is made of metal.

13. The rocket motor of claim 1, wherein the motor case is a cylindrical motor case.

14. The rocket motor of claim 1, wherein the inert rod is comprised of a non-energetic material.

15. The rocket motor of claim 14, wherein the non-energetic material is nylon.

16. A rocket motor comprising:
   a motor case containing a burnable propellant grain; and
   a burn rate enhancer assembly including:
      an inert rod;
      a groove in an exterior surface of the inert rod and extending along the length of the inert rod; and
      a reactive wire wherein the reactive wire is received in the groove;
   wherein the burn rate enhancer assembly is configured helically along a portion of the length of the inert rod; and
   wherein the burn rate enhancer assembly is disposed within the burnable propellant grain.

17. The rocket motor of claim 16, wherein the helical configuration of the burn rate enhancer assembly has a constant pitch along the length the inert rod.

18. The rocket motor of claim 16, wherein the helical configuration of the burn rate enhancer assembly has a varying pitch along the length of the inert rod.

19. A method of making a rocket motor; the method comprising:
   selecting an inert rod;
   machining the inert rod to have a groove in a helical configuration along a length of the rod;
   inserting a reactive wire inside the groove;
   positioning the inert rod and reactive wire assembly in a motor casing; and
   filling the motor casing with a burnable propellant grain such that the burnable propellant grain cures around the inert rod and reactive wire assembly.

* * * * *